June 10, 1924.
I. L. FULLER
ADJUSTABLE MOTOR FAN
Filed Jan. 2, 1923
1,496,776
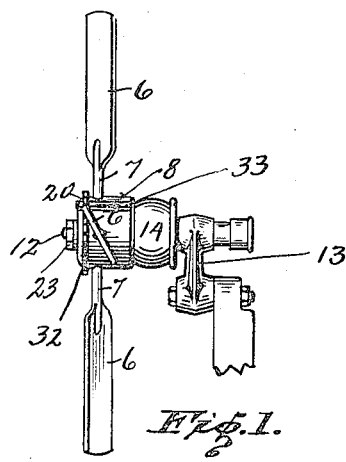
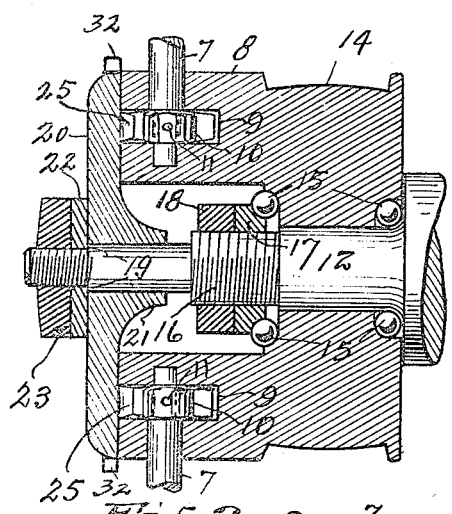

Patented June 10, 1924.

1,496,776

UNITED STATES PATENT OFFICE.

IRA L. FULLER, OF VALPARAISO, INDIANA.

ADJUSTABLE MOTOR FAN.

Application filed January 2, 1923. Serial No. 610,183.

*To all whom it may concern:*

Be it known that I, IRA L. FULLER, a citizen of the United States, residing at Valparaiso, in the county of Porter and State of Indiana, have invented new and useful Improvements in Adjustable Motor Fans, of which the following is a specification.

The object of this invention is to provide simple and inexpensive means for adjusting the angular relation of the blades of the radiator fan of motor cars so that a variable flow of air created by the rotation of the fan can be obtained to suit the changes in atmospheric temperature, the condition of the engine, and the character of gasoline, and the like.

I accomplish the above, and other objects which will hereinafter appear, by the mechanism illustrated in the accompanying drawings, in which—

Fig. 1 is a view in side elevation of a radiator fan and associated parts in operative position. Fig. 2 is a central longitudinal section on the line 2—2 of Fig. 3. Fig. 3 is a front elevation of the fan-hub with the fan-adjusting plate removed. Fig. 4 is an underside elevation of the locking disk. Fig. 5 is a plan view of one of the fan-shaft pinions, and Fig. 6 is a modified attachment of propeller shaft with the hub.

Like characters of reference indicate like parts in the several views of the drawings.

In my device a plurality of fan-blades 6, here shown as four in number, are each mounted on a shaft 7, the inner ends of which enter corresponding radial sockets in a hub 8, making a close rotary fit therein. These sockets each intersect a corresponding recess 9 in which a spur pinion 10 is introduced. The shaft 7 is squared above its inner end and passes through a correspondingly shaped hole through the center of the pinion by which assembly the two members are caused to move together. Removal of a shaft by centrifugal action or from other undesired causes is prevented by the insertion of a locking pin 11 through the pinion of that shaft and through the shaft. The end of shaft 7 beyond its squared portion is made cylindrical and this reduced portion is seated in an inner reduced portion of the socket to thereby additionally support and strengthen the fan.

The hub 8 is rotatively mounted on a fixed shaft 12, supported in the usual manner by a bracket 13, and a suitable portion 14 of the hub is finished for use as a pulley over which a driving-belt, not shown, is run to rotate the hub and fan. The shaft 12 is reduced to fit the smaller bore of the hub where it passes through the pulley, and to form a shoulder for the hub to run against. Races will be formed to receive ball-bearings 15. A portion 16 of the shaft is threaded and receives a ball-race member 17 and a locknut 18 by which the member 17 is held from working off. The shaft is further reduced in diameter to form a shoulder 19, and on this last reduced part a locking-disc 20 is mounted, with adjustment of rotation thereon. It has an inner hub-extension 21 that contacts the shoulder 19. The outer end of said last reduced part of the shaft is threaded and receives thereon a nut 22 and a locknut 23. By means of said last two nuts the disc is forced inwardly until the friction of its hub against the shoulder 19 is sufficient to hold the disc against rotatory adjustment. Formed on the inner side of the disc is an annular concentric row of cog teeth 25 that mesh with the teeth of all four of the pinions 10 and by such engagement holds a given position of the fan-blades.

In setting the device the fan-blades can all be in the same plane and the cogs on the disc 20 engaged with those of all of the pinions. Then by rotatably adjusting the disc in either direction, as desired, all of the fans will be correspondingly and similarly adjusted in their angular position, or, if it be desired to variously adjust the blades this can be accomplished by moving out the disc so as to release it from all of the pinions and then adjusting the blades as desired individually, after which they will be locked in the position given them by re-engagement of their pinions with the teeth on the locking disc.

The periphery of the disc 20 has teeth 32 between which a locking lug 33 on hub 8 appropriately enters to hold any given adjustment of the disc.

In the modified form shown in Fig. 6, the reduced end of propeller shaft 7 extends through to the bore of the hub where it is retained by washer 30 and pin 31, thereby providing a more secure connection of the shaft with the hub and a longer bearing for the shaft.

While I have here shown the best form of my device now known to me it is capable of variations, some of which have been described, and I therefore do not desire to be limited to the precise form shown or any more than is required by the appended claims, and having thus fully described my invention, what I claim is:—

1. In a radiator fan for motor cars, a shaft, a hub rotatably mounted on the shaft a portion of the hub having an annular space between it and the shaft said hub also having radial holes extending from the outside of the hub and communicating with said annular space and said hub having a recess for each hole intersected by the hole, a pinion in each recess having an end projecting into the annular space in the hub, a shaft in each hole to which one of said pinions is fixed, fan blades on each shaft, means in the annular space of the hub on the projecting ends of the radial shafts to prevent longitudinal movement of the shafts, a disk mounted around the first shaft having teeth meshing with the teeth of the pinions, and means for retaining a given adjustment of the disk.

2. In a radiator fan for motor cars, a hub having radial shaft-openings and a recess for each shaft-opening intersected by the latter, a plurality of shafts radially seated in the shaft-openings of the hub, each shaft having a fan-blade, a pinion in such recess mounted on and rotating with the shaft passing therethrough, a disc having an annular row of teeth engaging with the teeth of each of said pinions, said disc being rotatably adjustable to rotatably adjust the pinions, and means for locking the disc at any given adjustment.

3. In a device for the purposes specified, a shaft having a reduced portion forming a shoulder and a threaded outer end, a hub rotatably mounted on the shaft, said hub having radial sockets and recesses intersected by the sockets, a pinion in each recess, a shaft radially of the hub seated in each socket to each of which a pinion is fixed, fan-blades on each radial shaft, a disc mounted on the reduced portion of the first shaft having a hub contacting with said shoulder, said disc having an annular series of teeth meshing with all of the pinions and means for locking the disc by frictional engagement of its hub with the shoulder.

4. In a device for the purposes specified, a fixed shaft having a reduced portion forming a shoulder and part of a ball-race and having a second reduced portion forming a second shoulder, a hub rotatably mounted on the shaft and having radial sockets and recesses intersected by the sockets and also having a belt-pulley portion, ball-bearings between the hub and shaft opposite the belt-pulley portion some of which are against the ball-race shoulder, a pinion in each recess of the hub, a shaft seated radially of the hub in each socket to which a pinion is fixed, fan-blades on each radial shaft, a disc mounted on the last reduced portion of the fixed shaft having a hub to contact with said second shoulder, said disc having an annular series of teeth meshing with all of the pinions, and nuts on the threaded end of the fixed shaft to move the disc into locking engagement of its hub with the second shoulder.

Signed at Indianapolis, Indiana, this the 18th day of December, 1922.

IRA L. FULLER.